(12) United States Patent
Madisetti et al.

(10) Patent No.: US 11,223,877 B2
(45) Date of Patent: Jan. 11, 2022

(54) HYBRID BLOCKCHAINS AND STREAMCHAINS USING NON-CRYPTO HASHES FOR SECURING AUDIO-, VIDEO-, IMAGE-, AND SPEECH-BASED TRANSACTIONS AND CONTRACTS

(71) Applicant: Vijay Madisetti, Johns Creek, GA (US)

(72) Inventors: Vijay Madisetti, Johns Creek, GA (US); Arshdeep Bahga, Chandigarh (IN)

(73) Assignee: Vijay Madisetti, Johns Creek, GA (US)

( * ) Notice: Subject to any disclaimer, the term of this patent is extended or adjusted under 35 U.S.C. 154(b) by 0 days.

(21) Appl. No.: 16/383,720

(22) Filed: Apr. 15, 2019

(65) Prior Publication Data
US 2020/0260147 A1    Aug. 13, 2020

Related U.S. Application Data

(60) Provisional application No. 62/811,621, filed on Feb. 28, 2019, provisional application No. 62/804,243, filed on Feb. 12, 2019.

(51) Int. Cl.
*H04N 21/475* (2011.01)
*G06F 16/182* (2019.01)
(Continued)

(52) U.S. Cl.
CPC ..... *H04N 21/4753* (2013.01); *G06F 16/1824* (2019.01); *H04L 9/0643* (2013.01);
(Continued)

(58) Field of Classification Search
CPC ........... H04N 21/4753; H04N 21/4415; H04N 21/4751; H04L 9/0643; H04L 2209/38; G06F 16/1824
See application file for complete search history.

(56) References Cited

U.S. PATENT DOCUMENTS 6,697,948 B1 * 2/2004 Rabin ................ G06F 21/10
  705/52
10,075,298 B2 * 9/2018 Struttmann ............ G06F 21/64
(Continued)

OTHER PUBLICATIONS

Yaga et al., NISTIR 8202 Blockchain Technology Overview, Oct. 2019, National Institute of Standards and Technology U.S. Department of Commerce (Year: 2018).*
(Continued)

*Primary Examiner* — John W Hayes
*Assistant Examiner* — Dennis G Keritsis
(74) *Attorney, Agent, or Firm* — Daniel C. Pierron; Widerman Malek, PL

(57) ABSTRACT

A method of securing media-based transactions and contracts on a distributed ledger network comprising receiving a first media file, obtaining a fingerprint of the first media file, generating a non-cryptographic hash value for the fingerprint of the first media file, generating a block for the distributed ledger network comprising a block header comprising previous hash, a state root hash, a receipts root hash, and a transaction list root hash, defining block header hashes, recording the non-cryptographic fingerprint hash value for the fingerprint of the first media file to the block and recording the block to the distributed ledger network.

18 Claims, 8 Drawing Sheets

(51) Int. Cl.
  *H04L 9/06* (2006.01)
  *H04N 21/4415* (2011.01)
(52) U.S. Cl.
  CPC ..... *H04N 21/4415* (2013.01); *H04N 21/4751* (2013.01); *H04L 2209/38* (2013.01)

(56) References Cited

U.S. PATENT DOCUMENTS

| | | |
|---|---|---|
| 2016/0239571 A1 | 8/2016 | Rowe et al. |
| 2017/0263030 A1* | 9/2017 | Allen .................. G06Q 10/101 |
| 2017/0364701 A1 | 12/2017 | Struttmann |
| 2018/0109260 A1 | 4/2018 | Matsubara |
| 2018/0227119 A1 | 8/2018 | Bibera et al. |
| 2019/0238340 A1* | 8/2019 | Wang .................. G06F 16/1824 |

OTHER PUBLICATIONS

Satoshi Nakamoto, Bitcoin: A Peer-to-Peer Electronic Cash System (Year: 2010).*
Satoshi Nakamoto, Bitcoin: A Peer-to-Peer Electronic Cash System, Wayback Machine showing date (Year: 2010).*
Mendez, HandBook of Applied Cryptography (Year: 1965).*
Will Evans and Jan Manuch, Unit #5: Hash functions and the Pigeonhole principle (Year: 2016).*
J.W. Hunt and M.D. McIlroy, An Algorithm for Differential File Comparison (Year: 1976).*
Https://github.com/spotify/echoprint-codegen, GitHub, Inc., "Codegen for Echoprint", accessed Nov. 12, 2020.
Https://github.com/spotify/echoprint-server/, GitHub, Inc., "Echoprint-Server", accessed Nov. 12, 2020.
Https://github.com/acoustid/chromaprint, GitHub, Inc., "Chromaprint", accessed Nov. 12, 2020.
Https://labrosa.ee.columbia.edu/matlab/fingerprint/, Dan Ellis, "Robust Landmark-Based Audio Fingerprinting", accessed Nov. 12, 2020.
Https://github.com/aappleby/smhasher, GitHub, Inc., "SMHasher", accessed Nov. 12, 2020.
Https://github.com/google/cityhash, GitHub, Inc. "CityHash", accessed Nov. 12, 2020.
Batini et al. "Methodologies for Data Quality Assessment and Improvement" ACM Computing Surveys, vol. 41, No. 3, Article 16, Publication Date: Jul. 2009.
Https://profisee.com/data-quality-what-why-how-who, Profisee, "Data Quality—What, Why How, 10 Best Practices & More", accessed Jan. 25, 2021.
Rishe et al. "A Method of Matching Data", Mathematical Modelling, vol. 8, 1987, pp. 172-174.
Https://www.talend.com/blog/2016/12/13/data-matching-101-how-does-data-matching-work, Stefan Franczuk, "Data Matching 101: How Does Data Matching Work" Dec. 13, 2016.
Https://leadsift.com/how-to-determine-what-data-is-relevant-and-what-is-distracting, SREEJATA, "How to Determine What Data is Relevant and What is Distracting", Dec. 16, 2015, LeadSift.
Https://www.igi-global.com/dictionary/data-quality-assessment/6800, "What is Data Relevance" IGI Global, accessed Jan. 25, 2021.
Https://docs.microsoft.com/en-us/sql/data-quality-services/data-matching?view=sql-server-ver15&viewFallbackFrom=sql-server- . . . 1%2F25%2F2021, "Data Matching" Data Quality Services (DQS) Microsoft Docs, accessed Jan. 25, 2021.
Byun, Sung Chael—Korean Intellectual Property Office, International Search Report, International Application No. PCT/US2020/017835, dated Jun. 18, 2020.

* cited by examiner

HYBRID BLOCKCHAINS AND STREAMCHAINS USING NON-CRYPTO HASHES FOR SECURING AUDIO-, VIDEO-, IMAGE-, AND SPEECH-BASED TRANSACTIONS AND CONTRACTS

RELATED APPLICATIONS

This application claims priority under 35 U.S.C. § 119(e) of U.S. Provisional Patent Application Ser. No. 62/804,243 filed on Feb. 12, 2019 and titled *Hybrid Blockchains Using Non Crypto Hashes for Securing Audio, Video, Speech or Image Transactions and Contracts*, and U.S. Provisional Patent Application Ser. No. 62/811,621 filed on Feb. 28, 2019 and titled *StreamChain—An Improved Blockchain*. The contents of these applications are incorporated herein by reference.

FIELD OF THE INVENTION

The present invention relates to hybrid blockchains and streamchains using non-cryptographic hashes for securing audio-, video-, image-, and speech-based transactions and contracts.

BACKGROUND OF THE INVENTION

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Audio fingerprinting is used to convert the an audio signal/recording into a series of short numerical values (or hashes) that aim to uniquely identify the audio signal/recording. Audio fingerprinting techniques use hashing algorithms that utilize the perceptual aspects of the audio contained in the file and not just the way that the file itself is encoded digitally. Audio fingerprinting systems can identify audio even if it has been altered in different ways such as by down-sampling, filtering, equalization, re-sampling, compression, adding noise or echo.

Audio fingerprints generally do not have the time of creation via real-time clock and timestamp, nor are audio fingerprints linked to other audio finger prints in terms of a streaming content. Nor are there support for different types of alternate fingerprints that may have very similar non-cryptographic hashes.

While existing Blockchain platforms such as Ethereum or databases such as Amazon Quantum Ledger Database (QLDB) can be used for storing audio/video fingerprint data (either within smart contracts or data records) and provide an immutable and cryptographically verifiable transaction log, however, these existing solutions use cryptographic hashes. Cryptographic hashes are unsuitable for audio fingerprinting because fingerprinting algorithms should generate similar hashes on audio that sounds the same to an ear but may be stored or encoded differently. The problem with using cryptographic hashes for transactions containing audio/video data is that even minute differences can result in mismatches. Transactions based on clean or noisy data can generate different cryptographic hash values even if both are authentic and valid.

Cryptographic hashes are not easily applied where transactions can contain audio, speech, image or video data that is affected by noise, or background, or context of the audio and video. For example, slurred speech or hazy video of the same scenes or same person may result in widely differing cryptographic hashes. The same audio recording when encoded differently and stored in different file formats can produce different cryptographic hashes. Audio processing techniques such as down-sampling, re-sampling, filtering, equalization can result in widely differing cryptographic hashes.

Some known and widely used audio fingerprinting techniques are:

1. EchoPrint: Echoprint is a freely available audio fingerprint algorithm (github.com/spotify/echoprint-codegen) and server (github.com/spotify/echoprint-server/). EchoPrint was created and released by music technology company The Echo Nest. Spotify acquired The Echo Nest in 2014. The Echoprint algorithm works by finding onsets points in time where musical notes occur. Features are created by calculating the difference in time between subsequent onsets and creating a hash of these time values. Matching recordings are found by looking for identical hashes in the reference database.

2. ChromaPrint: Chromaprint is an audio fingerprint library developed for the AcoustID project and available at github.com/acoustid/chromaprint. ChromaPrint is designed to identify near-identical audio and the fingerprints it generates are as compact as possible to achieve that. It trades precision and robustness for search performance. The target use cases are full audio file identification, duplicate audio file detection and long audio stream monitoring.

3. Landmark: Landmark audio fingerprinting technique is very well suited to identifying small, noisy excerpts from a large number of items. It is based on the ideas used in the Shazam music matching service, which can identify seemingly any commercial music tracks from short snippets recorded via cellphones even in very noisy conditions. (labrosa.ee.columbia.edu/matlab/fingerprint/).

Some known and widely used non-cryptographic hashing techniques are:

1. Murmurhash: Murmur hashing is a non-cryptographic hash function which is used for hash based look-ups. Murmurhash uses three basic operations—Multiply, Rotate and XOR. Within the hashing algorithm, multiple constants are used to make it good hash function. Murmurhash provides good distribution (passes Chi-Squared test) and good avalanche behavior (passes Avalanche test) and good collision resistance. (github.com/aappleby/smhasher)
2. CityHash: CityHash family of hash functions for strings. The functions mix the input bits thoroughly but are not suitable for cryptography. (github.com/google/cityhash)
3. Locality Sensitive Hashing (LSH): LSH is a hashing technique designed for reducing the dimensionality high-dimensional data by mapping similar items map to the same buckets with high probability. LSH is designed to maximize the probability of a collision for similar items. LSH is typically used to find similar entries in large databases.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to the use of audio/video fingerprints, non-cryptographic hashes, a new type of consensus architecture (StreamChain), and new mining process, including:

- a blockchain with cryptographic hashes & audio/video fingerprints in transactions;
- a blockchain with non-cryptographic hashes & audio/video fingerprints in transactions;
- a StreamChain with cryptographic hashes, audio/video fingerprints in transactions, multiple copies of blocks according to suitability & updates in mining process;
- a StreamChain with non-cryptographic hashes, audio/video fingerprints in transactions, updating of past blocks via quality & updates in mining process; and
- a StreamChain that uses a DB and a Blockchain.

Certain embodiments of the present invention may comprise the following features:

1. Ability to securely identify and verify speech and audio content and transactions. StreamChain can verify if the audio/video data belongs to a certain user and time and corresponds to certain transaction or event—a musical composition, a sports event, or a business context.
2. Ability to go backwards in time to "rewrite" or "substitute" an older block on a blockchain with higher quality data that has a similar fingerprint or hash also recorded at a contemporaneous real-time value. There is a difference between versions of transactions (that may represent modifications of same content over time), versus "alternates" or "alternatives" that use better audio (or less noisy or more relevant audio) with the same or similar real-time timestamp that can be used in current StreamChain.
3. Ability to append (in a secure and verifiable manner) and select the "best" version of the information for the next or past blocks on a blockchain.
4. Allows controlled rewriting that is verifiable as old blocks and new blocks that overwrite them coexist.
5. The old blocks are also saved but they are "hidden" and can be put back into view if there is a problem. alternative versions of blocks can be ranked based on parameter such as quality of audio or video recording.
6. Data blocks or transactions can be changed only if hashes are similar and have same or similar timestamp.
7. In certain embodiments of StreamChain the hash for the entire block is a non-cryptographic hash. This can simplify the mining process. A fast mining approach can be used that does not consume extensive resources. Within StreamChain it is also possible to merge transactions from multiple chains that contain speech, audio and video data that can be checked and substituted or altered subject to certain constraints.
8. Large amounts of audio and video data can be stored off the chain while their fingerprints are stored on the blockchain.
9. Model View Controller (MVC) can be applied to StreamChain where different views are generated from same model where each view uses different alternatives chosen from those stored on the blockchain.
10. The consensus mechanism is changed from the hard yes/no binary options available in existing blockchains to the "fuzzy" sliding match afforded by non-cryptographic hashes (such as LSH).

In certain embodiments, the present invention may provide the following advantages:

1. Verification of transactions by miners can be simplified using non-cryptographic hashes when audio, speech or video transactions are part of the chain (not digital documents or transactions).
2. This allows approximate matches to reference fingerprint information from similar transactions by the same user or other user to identify fraud and also to summarize or pool data.
3. Also, can be used to provide verification of identity of the blockchain account holders in the party to the contract by having them include audio and speech or video evidence into the record in an automated manner that can be verified by the hybrid non-cryptographic/cryptographic blockchain.
4. Approximate verification may result in the concept of fuzzy blockchains that trade-off accuracy for speed or wider inclusion of types of data that is frequency subjected to noise, interference (e.g., speech under noisy conditions from the same user can be different that in clear noise-free conditions, or smoky or fuzzy video can be the only available evidence from a scene).
5. Different strategies for preventing attacks for non-cryptographic hashed blockchains or hybrid chains are to be used using variety of new techniques—such as having multi-factor verification or voting.
6. Some blocks in the blockchain may remain cryptographic-based hashed and others could be non-cryptographic hashed or a hybrid with or without differentiating markers.
7. Smart contracts may be used to operate on hybrid blocks using shared variables or bulletin boards or synchronizing transactions across multiple blockchains or Stream Chains.

Additionally, embodiments of the invention are directed to a method of securing media-based transactions and contracts on a distributed ledger network comprising receiving a first media file, obtaining a fingerprint of the first media file; generating a non-cryptographic hash value for the fingerprint of the first media file, generating a block for the distributed ledger network comprising a block header comprising previous hash, a state root hash, a receipts root hash, and a transaction list root hash, defining block header hashes, recording the non-cryptographic fingerprint hash value for the fingerprint of the first media file to the block, and recording the block to the distributed ledger network. In some embodiments, the block header hashes may be cryptographic hashes. In some embodiments, the block header hashes may be non-cryptographic hashes.

In some embodiments, the media file may be one of an image file, an audio file, and a video file. The media file may be extracted from a live recording, or from streaming multimedia content over a network.

In some embodiments, the fingerprint may be derived from temporal and frequency properties of the media file. The fingerprint may comprise a real-time clock timestamp corresponding to the media file.

In some embodiments, the distributed ledger network may be a blockchain network. In some embodiments, the distributed ledger network may be a streamchain network. In such embodiments, the method may further comprise receiving a second media file, obtaining a fingerprint of the second media file, generating a non-cryptographic hash value for the fingerprint of the second media file, generating a second version of the block for the distributed ledger network, recording the non-cryptographic hash value for the fingerprint of the second media file to the second version of the block, and recording the second version of the block to the streamchain network. Furthermore, the first and second media files may be derived from a common source media recording or event. In some embodiments, the method may further comprise determining whether the non-cryptographic hash value for the fingerprint of the second media file is within a threshold similarity of non-cryptographic hash value for the fingerprint of the first media file, upon determining the non-cryptographic fingerprint hash value for the fingerprint of the second media file is within a threshold similarity of non-cryptographic fingerprint hash value for the fingerprint of the first media file, accepting the second version of the non-cryptographic hash value in the ledger of the streamchain if a score value of the second media file is better than the score value of the first media file, and upon determining the non-cryptographic fingerprint hash value for the fingerprint of the second media file is not within a threshold similarity of non-cryptographic fingerprint hash value for the fingerprint of the first media file, rejecting the second version of the non-crypto hash value from the ledger of the streamchain. The first and second versions of the non-crypto hash values block may be ordered based upon a score value that is derived from at least one of match quality and relevance of the respective media files.

DETAILED DESCRIPTION OF THE INVENTION

Figure 1:
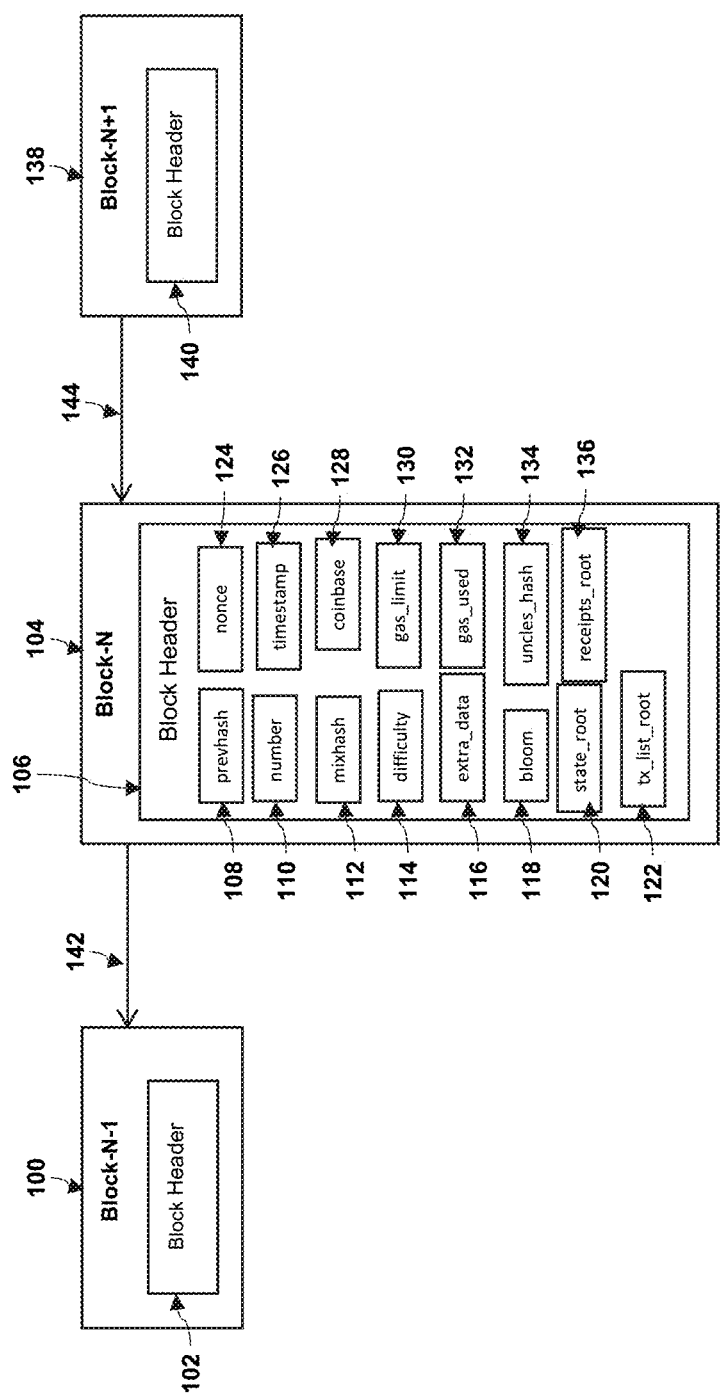
FIG. 1 is an illustration of an existing blockchain design used by public blockchain networks, such as Ethereum.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-9, a hybrid blockchain system using non-cryptographic hashes for securing audio, video, speech or image transactions and contracts according to an embodiment of the present invention is now described in detail. Throughout this disclosure, the present invention may be referred to as StreamChain, a hybrid blockchain system, non-cryptographic blockchain system, a blockchain-based audio fingerprinting system, a device, a system, a product, and a method. Those skilled in the art will appreciate that this terminology is only illustrative and does not affect the scope of the invention. Moreover, those skilled in the art will appreciate that all processes described herein may be performed by a computing device comprising, but not limited to, a network communication device operable to communicate across a network, such as a wide area network, including the Internet, a processor in communication with the networking communication device and operable to perform computing functions, and a data store capable of receiving, storing, and providing information to each of the network communication device and the processor.

Referring now to FIG. 1, for example, and without limitation, a blockchain structure is described in more detail. The blockchain structure comprises a sequence of blocks 100, 104, 138 where each block is identified by its cryptographic hash (the nonce field 124) and references the hash of its parent block (previous hash field 108). The cryptographic hash of a block is used to verify that a sufficient amount of computation has been carried out on this block and the block contains a valid proof-of-work (PoW). Each block 100, 104, 138 maintains records of all the transactions on the network received since the creation of its previous block. The blocks 100, 104, 138 each comprise respective headers 102, 106, 140 comprising a plurality of elements 108, 110, 112, 114, 116, 118, 120, 122, 124, 126, 128, 130, 132, 134, 136 that will be discussed in greater detail below.

Figure 2:
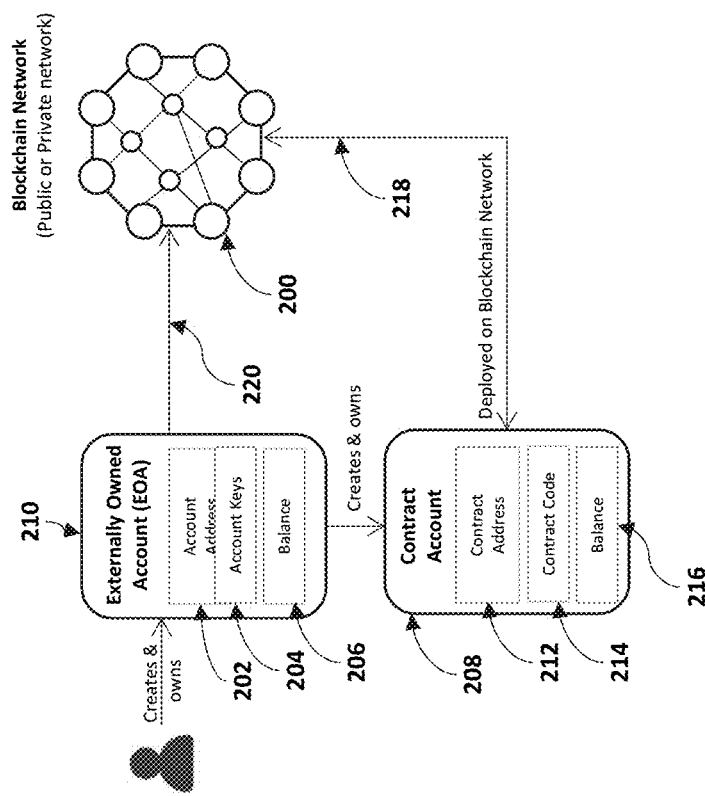
FIG. 2 is an illustration of the blockchain account types and interactions.

Referring now to FIG. 2, for example, and without limitation, blockchain account types and interactions between them, are described in more detail. Blockchain is a distributed and public ledger which maintains records of all the transactions. A blockchain network 200 is a truly peer-to-peer network and it does not require a trusted central authority or intermediaries to authenticate or to settle the transactions or to control the network infrastructure. Users can interact and transact with the blockchain networks through Externally Owned Account (EOAs) 210, which are owned and controlled by the users. Each EOA 210 has an account address 202, account public-private keys 204 and a balance 206 (in certain units of a Cryptocurrency associated with the Blockchain network) associated with it. EOAs do not have any associated code. All transactions 220 on a blockchain network are initiated by EOAs. These accounts can send transactions to other EOAs or contract accounts. Another type of accounts support by second generation programmable Blockchain platforms are the Contract Accounts 208. A Contract Account 208 is created and owned by an EOA 210, is located at a contract address 212, and is controlled by the associated contract code 214 which is stored with the contract account 208. Additionally, the contract account 208 may comprise a balance 216, which may be identical to the balance 206 of the EOA 210. The contract code 212 execution is triggered by transactions 218 sent by EOAs or messages sent by other contracts.

Figure 3:
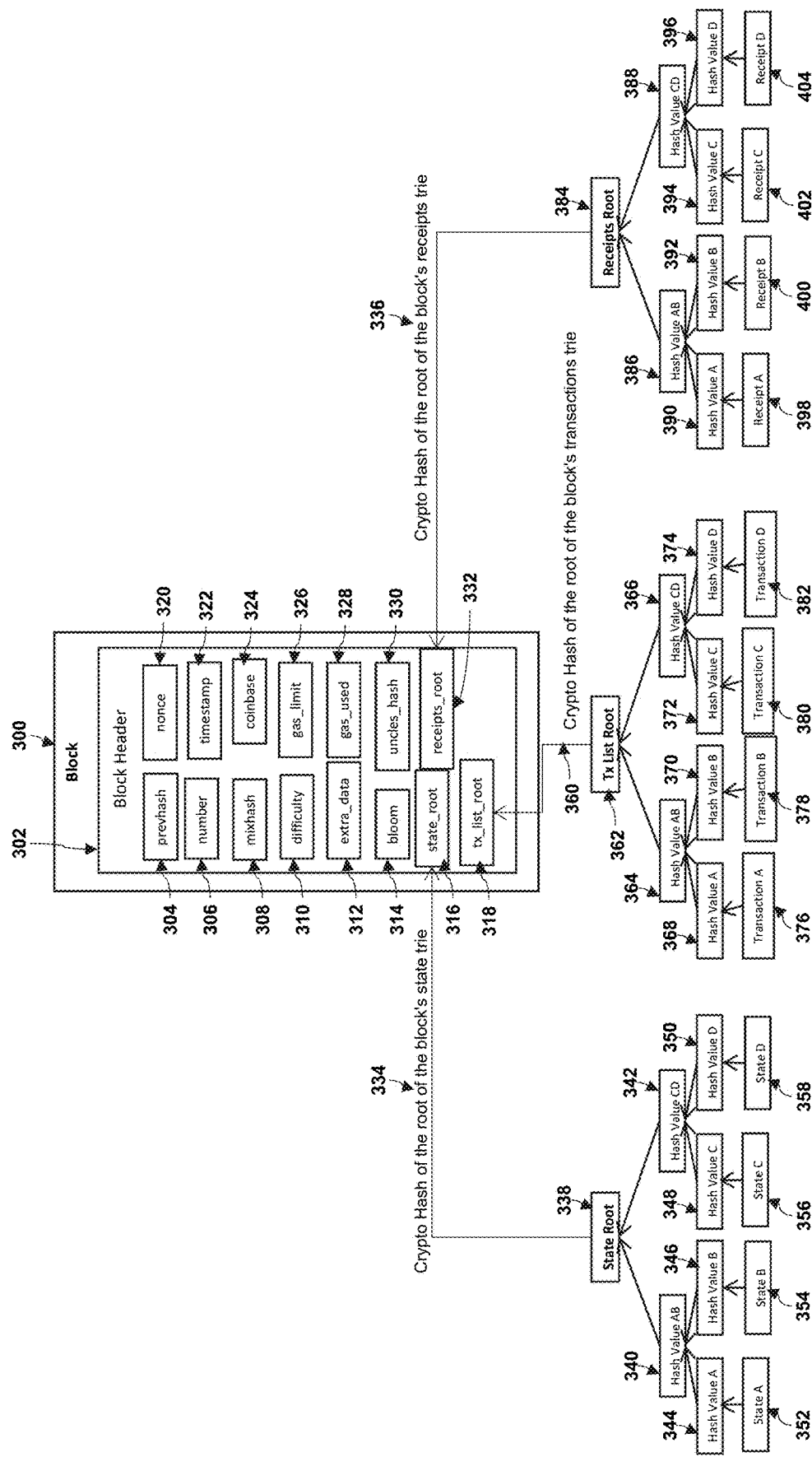
FIG. 3 is an illustration of the field in the block header used in existing blockchain networks, such as Ethereum.

Referring now to FIG. 3 is an illustration of the field in the block header used in existing blockchain networks such as Ethereum, is described in more detail. In a blockchain network such as Ethereum, the world state and list of transactions and their receipts are stored in a special tree structures based on Merkle Patricia Tree (also called a Trie). The world state is a mapping between the account addresses and the account states. World state is stored 334 in a Merkle Patricia Tree (state trie) 340-658. The root hash of the state trie 338 is stored in the block header 302. The list of transactions in a block is stored 360 in a trie structure 364-382 and the root hash of the transactions trie 362 is stored in the block header 302. A receipt of each transaction which contains information related to the transaction execution is stored 336 in a trie 386-404 and the root hash of the receipts trie 384 is structure stored in the block header 302. The fields in the block header 302 of a block 300 are described as follows:

Block Number (number) 306: This is a scalar value equal to the number of ancestors of the block. For genesis block, the block number is zero.

Timestamp (timestamp) 322: This is the UNIX timestamp value at the creation of the block.

Nonce (nonce) 320: The nonce field is a 64-bit hash, which along with mixhash field is used to verify that a sufficient amount of computation has been carried out on this block, and the block contains a valid proof-of-work (PoW).

Mix Hash (mixhash) 308: The mixhash field is a 256-bit hash, which along with nonce field is used to verify that the block contains a valid proof-of-work.

Parent Hash (prevhash) 304: Each block in a blockchain is linked to its parent through the parentHash, which is the hash of the parent block header.

Coinbase Address (coinbase) 324: This is a 20-byte address of the account to which all the rewards for mining of the block and the execution of contracts are transferred.

Block Difficulty (difficulty) 310: This field specifies a difficulty value for mining. A block is valid only if it contains a valid proof-of-work (PoW) of a given difficulty.

Gas Limit (gas_limit) 326: The gas limit value is the limit of gas expenditure for the block.

Gas Used (gas_used) 328: This is the total gas used for all the transactions in the block.

Extra Data (extra_data) 312: Optional 32-byte extra data can be provided in the block.

Uncles Hash (uncles_hash) 330: This is the 32 byte hash of the RLP encoded list of uncle headers.

State Root (state_root) 316: This is the 32 byte hash of the root of the block's state trie after the transactions are executed.

Transactions List Root (tx_list_root) 318: This is the 32 byte hash of the root of the block's transaction trie which is populated with the transactions in the block.

Receipts Root (receipts_root) 332: This is the 32 byte hash of the root of the block's receipts trie which is populated with the receipts of the transaction in the transactions list of the block.

Bloom Filter (bloom) 314: Bloom filter composed from the set of logs created through execution of the transactions in the block.

Figure 4:
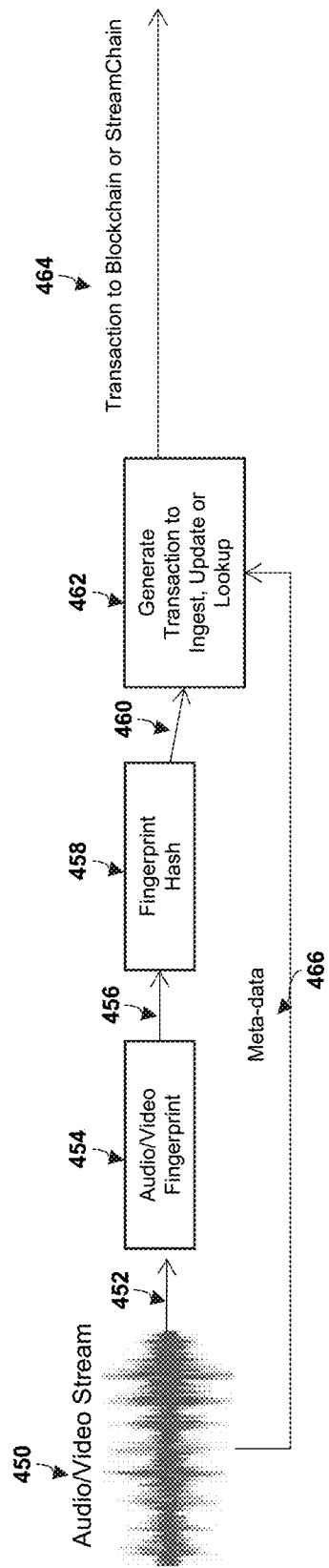
FIG. 4 is an illustration of the process of generating transactions for Blockchain or StreamChain from audio/video data, according to an embodiment of the invention.

Referring now to FIG. 4, an illustration of the process of generating transactions for Blockchain or StreamChain from audio/video data, is described in more detail. Given 452 an audio and/or video stream 450, audio/video fingerprinting techniques 454 are used to generate 456 a fingerprint hash 458. The fingerprint hash 458 is combined 460 with the audio/video meta-data 466 to generate 462 a transaction 464 to Blockchain or StreamChain. To generate fingerprint hashes for audio/speech/image/video existing fingerprinting techniques such as EchoPrint, ChromaPrint or Landmark or non-cryptographic hashing techniques such as MurmurHash or CityHash, Locality Sensitive Hashing can be used.

Figure 5:
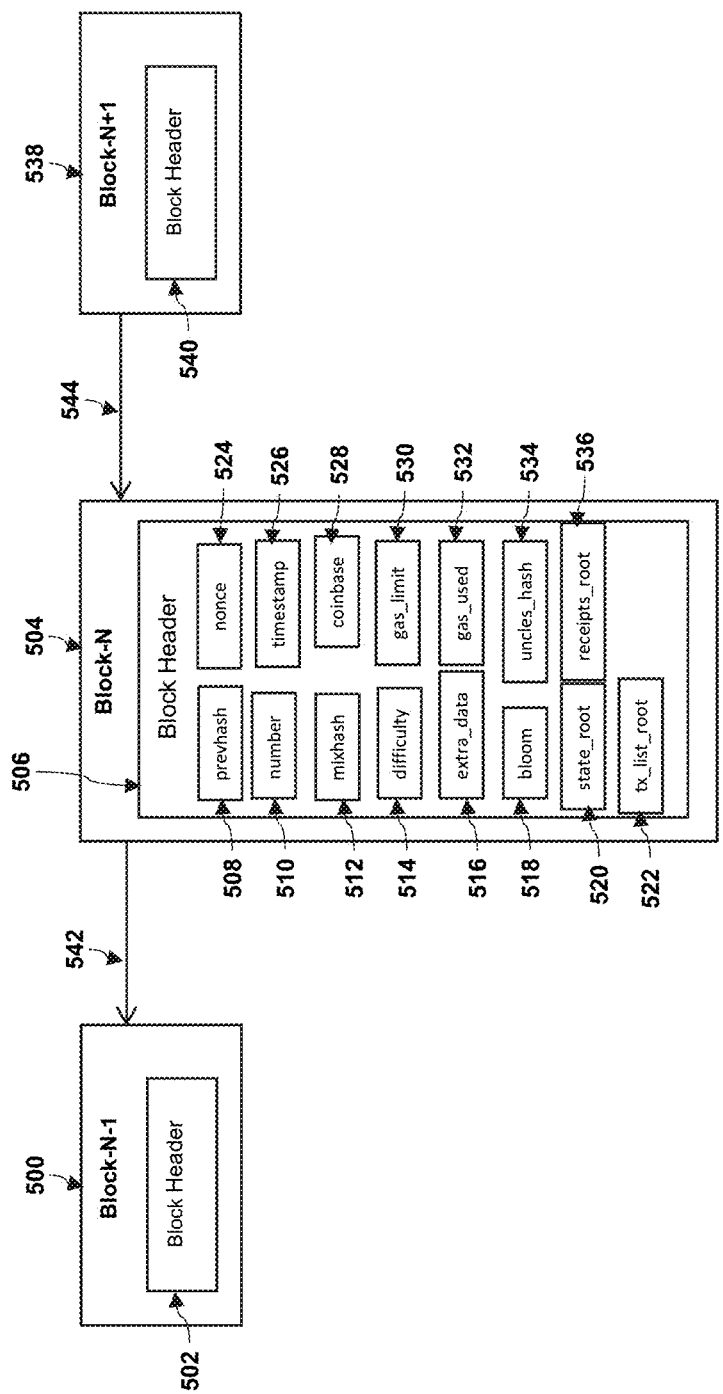
FIG. 5 is an illustration of Blockchain with cryptographic hashes and audio/video fingerprints in transactions, according to an embodiment of the invention.

Referring now to FIG. 5, a blockchain with cryptographic hashes and audio/video fingerprints in transactions according to an embodiment of the invention is presented. In the present embodiment of the invention, a blockchain with cryptographic hashes is used. The Previous Hash 508, State Root Hash 520, Receipts Root Hash 536 and Transaction List root hash 522 fields in the block headers 502, 506 and 540 use cryptographic hashes. The blockchain structure is immutable and secure. Transactions sent to the blockchain network contain audio/video fingerprints and meta-data. The fingerprint hashes within the transactions are non-cryptographic hashes. The block headers 502, 506, 540 may further comprise Number 510, Mix Hash 512, Difficulty 514, Extra Data 516, Bloom 518, Nonce 524, Time Stamp 526, Coinbase 528, and Uncles Hash 534 fields as described herein above.

Figure 6:
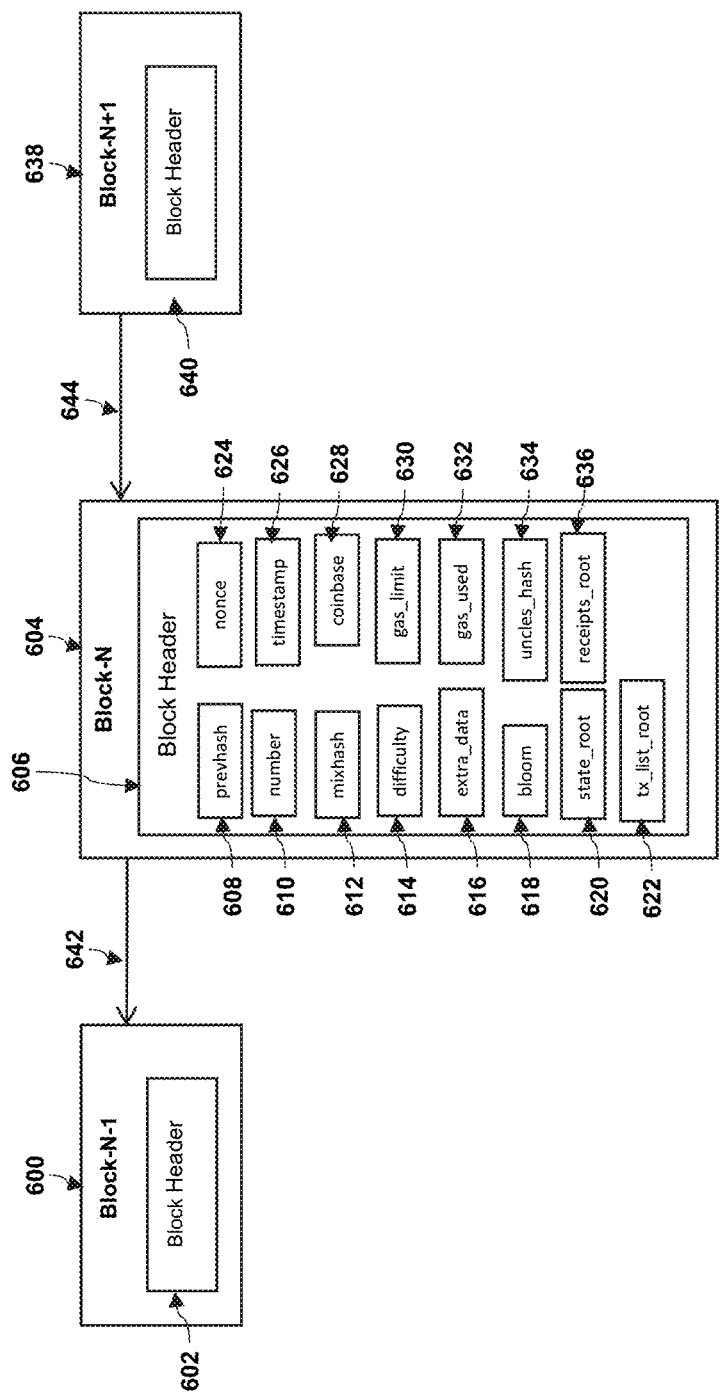
FIG. 6 is an illustration of a Blockchain with non-cryptographic hashes and audio/video fingerprints in transactions, according to an embodiment of the invention.

Referring now to FIG. 6, a blockchain with non-cryptographic hashes and audio/video fingerprints in transactions according to an embodiment of the invention is presented. In this embodiment of the invention, a blockchain with non-cryptographic hashes is used. The Previous Hash 608, State Root Hash 620, Receipts Root Hash 636 and Transaction List root hash 622 fields in the block headers 602, 606 and 640 use non-cryptographic hashes. The Blockchain structure is immutable and secure. Transactions sent to the blockchain network contain audio/video fingerprints and meta-data. The fingerprint hashes within the transactions are non-cryptographic hashes. The block headers 602, 604, 640 further comprise additional fields 640-618, 624-628, and 634 similar to those of block headers 502, 506, 540 shown in FIG. 5.

Figure 7:
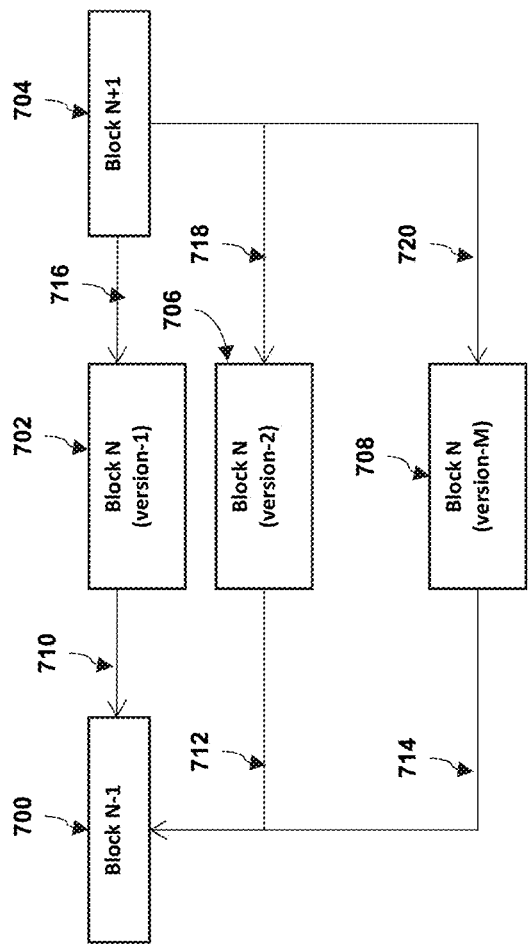
FIG. 7 is an illustration of StreamChain with cryptographic hashes, according to an embodiment of the invention.

Referring now to FIG. 7, a StreamChain with cryptographic hashes according to an embodiment of the invention is presented. In the present embodiment of the invention, a StreamChain with cryptographic hashes is used. Each block of the StramChain may comprise headers having fields similar to those of the headers of the embodiment shown in FIG. 5. Previous Hash, Transaction Hash, State Root Hash, Receipts Root Hash and Transaction List root hash fields comprised by headers of the blocks 700, 702, 704, 706, 708 of the StreamChain may use cryptographic hashes. StreamChain supports secure data storage, indexing, ranking, appending, versioning, matching and recovery of data. Transactions sent to the StreamChain network may contain audio fingerprints and meta-data. The fingerprint hashes within the transactions may be non-cryptographic hashes. Alternative options of the blocks such as 702, 706 and 708 may contain fingerprinted audio/video from different microphones and video cameras. Each block version 702, 706, 708 may be chained 710, 712, 714 to the previous block 700, and the next block 704 may be chained 716, 718, 720 to each block version 702, 706, 708. The "alternatives" can be ordered by match quality or relevance. The mining process is updated to support non-cryptographic hashes and allow alternative options of blocks. The updated mining process involves transaction validation, choosing best versions, cleaning up, rewriting old blocks, storing versions and linking to choose subset as part of the StreamChain. The mining process may involve additional steps such as matching content types, verifying whether the audio/video belongs to a certain user and time or corresponds to a certain type of transaction (such as music, speech or business). Mining process may also support merging transactions from multiple chains that contain speech, audio and video data that can be checked. Additional capabilities such as matching, searching and compaction may be incorporated within the updated mining process for Stream Chain.

Figure 8:
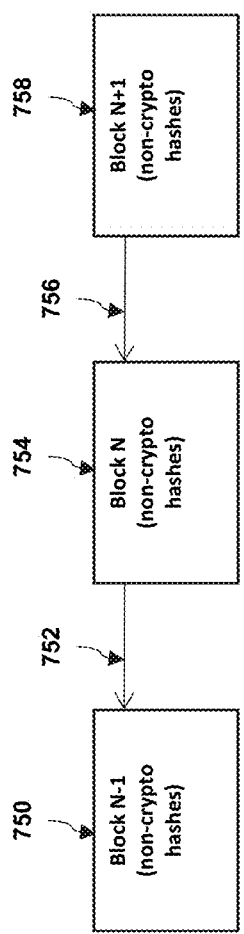
FIG. 8 is an illustration of StreamChain with non-cryptographic hashes, according to an embodiment of the invention.

Referring now to FIG. 8, a StreamChain with non-cryptographic hashes according to an embodiment of the invention is presented. In the present embodiment of the invention, a StreamChain with cryptographic hashes is used. In one embodiment, each block of the StreamChain may comprise headers having fields similar to those of the headers of the embodiment shown in FIG. 6, specifically, the fields may be non cryptographic. In another embodiment, the Hash, Transaction Hash, State Root Hash, Receipts Root Hash and Transaction List root hash fields comprised by headers of the blocks 750, 754, 756 of the StreamChain may use cryptographic hashes. Transactions sent to the StreamChain network contain audio fingerprints and meta-data. The fingerprint hashes within the transactions are non-cryptographic hashes. The mining process is updated to support non-cryptographic hashes and updating previous blocks so that we can substitute a block with a "noisy" audio fingerprint with another block that has a "better" audio fingerprint and go "backwards" in time in mining. StreamChain is different from existing blockchain technology as existing blockchain technology cannot go "backwards" and "rewrite" or "substitute" an older block once a block has been mined. For speech, audio and video, we may prefer to use better samples for past blocks, for example, we can create a quick and dirty block of a "noisy" music and later substitute it with "master copy" as long as the hashes are within a threshold similarity. A quick copy for the real-time timestamp is stored in the new version and substitute the newer higher-quality data sample with the older timestamp, as long as similarity is present.

Figure 9:
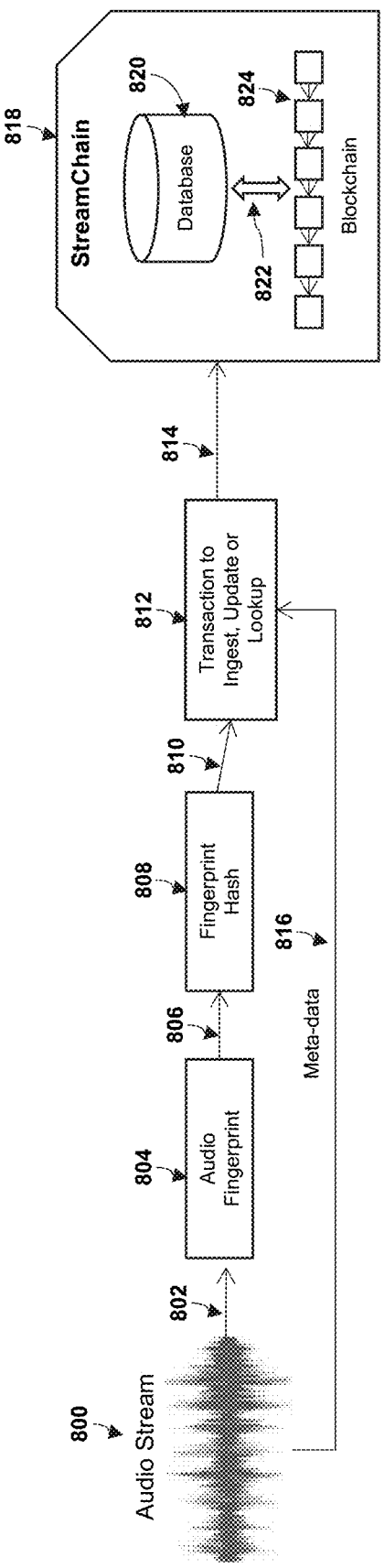
FIG. 9 is an illustration of StreamChain that uses a database and a Blockchain, according to an embodiment of the invention.

Referring now to FIG. 9, a StreamChain that uses a database and a blockchain according to an embodiment of the invention is presented. In the present embodiment of the invention, a StreamChain comprising a Database 820 and a Blockchain 824 is used. The Database 820 stores audio fingerprint hashes and indexes them for fast matching and retrieval. Fingerprint hashes 808 are timestamped and versioned within the database. Transactions sent 814 to the StreamChain network, generated as shown in FIG. 4, contain audio fingerprints 804 and meta-data 816. The fingerprint hashes 808 within the transactions are non-cryptographic hashes. The Blockchain 824 maintains an immutable and cryptographically secure log of all the transactions to add/append/delete data in the database. Blockchain uses cryptographic hashes for transactions and blocks. Alternate embodiments can also use non-crypto hashes for the entire blocks (as used in FIG. 8, for instance).

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method of securing media-based transactions and contracts on a blockchain network comprising:
generating a first fingerprint of a first media stream, the first fingerprint comprising a first real-time timestamp;
generating a first non-cryptographic hash value of the first fingerprint of the first media stream;
generating a first transaction from a combination of the first non-cryptographic hash value and metadata from the first media stream, the first transaction comprising a block header comprising a plurality of fields;
sending the first transaction to the blockchain network;
generating a second fingerprint of a second media stream, the second fingerprint comprising a second real-time timestamp;
generating a second non-cryptographic hash value of the second fingerprint of the second media stream, the second non-cryptographic hash value being a second version of the first non-cryptographic hash value;
generating a second transaction from a combination of the second non-cryptographic hash value and metadata from the second media stream;
sending the second transaction to the blockchain network; and
ordering the second transaction as a second version of the first transaction in the blockchain network.

2. The method according to claim 1 wherein at least one field of the plurality of fields comprised by the block header comprises a cryptographic hash.

3. The method according to claim 1 wherein at least one field of the plurality of fields comprised by the block header comprises a non-cryptographic hash.

4. The method according to claim 1 wherein the first media stream is one of an image stream, an audio stream, and a video stream.

5. The method according to claim 1 where the first media stream is extracted from a live recording.

6. The method according to claim 1 where the first media stream is extracted from streaming multimedia content over a network.

7. The method of claim 1 wherein the fingerprint is derived from temporal and frequency properties of the first media stream.

8. The method of claim 1, where the first and second media streams are derived from a common source media recording or event.

9. The method of claim 1 wherein the fields of the block header fields do not comprise a cryptographic hash.

10. The method of claim 1 wherein the fields of the block header fields do not comprise a non-cryptographic hash.

11. A system comprising:
a processor;
a network communication device positioned in communication with the processor and a network; and
a data store device positioned in communication with each of the processor and the network communication device storing instructions that when executed by the processor cause the processor to perform the operations of:
generating a first fingerprint of a first media stream, the first fingerprint comprising a first real-time timestamp;
generating a first non-cryptographic hash value of the first fingerprint of the first media stream:
generating a first transaction from a combination of the first non-cryptographic hash value and metadata from the first media stream, the first transaction comprising a block header comprising a plurality of fields;
sending the first transaction to the blockchain network:
generating a second fingerprint of a second media stream, the second fingerprint comprising a second real-time timestamp;
generating a second non-cryptographic hash value of the second fingerprint of the second media stream, the second non-cryptographic hash value being a second version of the first non-cryptographic hash value;
generating a second transaction from a combination of the second non-cryptographic hash value and metadata from the second media stream;
sending the second transaction to the blockchain network; and
ordering the second transaction as a second version of the first transaction in the blockchain network.

12. The system according to claim 11 wherein the instructions cause the processor to generate at least one field of the plurality of fields comprised by the block header to comprise a cryptographic hash.

13. The system according to claim 11 wherein the instructions cause the processor to generate at least one field of the plurality of fields comprised by the block header to comprise a non-cryptographic hash.

14. The system according to claim 11 wherein the first media stream is one of an image stream. an audio stream, and a video stream.

15. The system according to claim 11 wherein the first media stream is extracted from a live recording.

16. The system according to claim 11 wherein the first media stream is extracted from streaming multimedia content over a network.

17. The system according to claim 11 wherein the fingerprint is derived from temporal and frequency properties of the first media stream.

18. The system of claim 11 where the first and second media streams are derived from a common source media recording or event.

* * * * *